(12) United States Patent
Guesnon et al.

(10) Patent No.: US 7,341,281 B2
(45) Date of Patent: Mar. 11, 2008

(54) CONNECTOR FOR HIGH-PRESSURE RISER

(75) Inventors: Jean Guesnon, Chatou (FR); Gérard Papon, Les Essarts-le-Roi (FR); Emmanuel Persent, Croissy-sur-Seine (FR); Florence Richard, Saint-Cloud (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 230 days.

(21) Appl. No.: 11/066,171

(22) Filed: Feb. 28, 2005

(65) Prior Publication Data

US 2005/0206163 A1  Sep. 22, 2005

(30) Foreign Application Priority Data

Mar. 1, 2004  (FR) .................................. 04 02113

(51) Int. Cl.
*F16L 55/00* (2006.01)
(52) U.S. Cl. .................. 285/81; 285/314; 285/386; 285/402
(58) Field of Classification Search .................. 285/26, 285/29, 81, 91, 92, 351, 402, 913, 914, 313–314, 285/386; 166/242.6, 367; 403/348–349
See application file for complete search history.

(56) References Cited

U.S. PATENT DOCUMENTS

| 3,422,390 | A | * | 1/1969 | Tucker | 439/348 |
| 3,447,821 | A | * | 6/1969 | Bochory | 285/148.27 |
| 4,062,571 | A | | 12/1977 | Sicard | |
| 4,097,069 | A | * | 6/1978 | Morrill | 285/84 |
| 4,185,856 | A | * | 1/1980 | McCaskill | 285/18 |
| 4,280,719 | A | * | 7/1981 | Daniel et al. | 285/90 |
| 6,746,057 | B2 | * | 6/2004 | Goto et al. | 285/333 |

FOREIGN PATENT DOCUMENTS

| FR | 1 457 319 | 12/1976 |
| FR | 2 432 672 | 2/1980 |
| FR | 2 464 426 | 3/1981 |
| FR | 2526517 | 5/1982 |

* cited by examiner

*Primary Examiner*—Aaron Dunwoody
*Assistant Examiner*—Fannie C. Kee
(74) *Attorney, Agent, or Firm*—Antonelli, Terry, Stout & Kraus, LLP.

(57) ABSTRACT

A connector (1) for joining two pipe sections (2) and (3) making up a riser includes a male tubular element (4) and a female tubular element (5) which fit into each other and have an axial shoulder (8) or (9). Locking ring (10), mounted mobile in rotation on the male element (4) or the female element (5), includes studs which cooperate with the studs of female element (5) or the male element (4) so as to form a bayonet connection. The male (4) and female (5) tubular elements include teeth and cavities, the teeth of one of the elements fitting into the cavities of the other element so as to lock in rotation one of the elements in relation to the other.

16 Claims, 6 Drawing Sheets

CONNECTOR FOR HIGH-PRESSURE RISER

FIELD OF THE INVENTION

The present invention relates to the sphere of very deep sea drilling and oil production. More particularly, the present invention provides a connector allowing to join together the pipes making up a riser.

According to the present invention, the wellhead and all its constituents, notably the blowout preventer, commonly referred to as BOP, are above the water line and arranged on a floating support. This assembly affords the advantage of having the architecture of an onshore drilling equipment, i.e. with a wellhead above the water line, directly accessible to operators. Therefore, there are no more auxiliary lines, commonly referred to as a kill line and a choke line, running through the water depth. The riser can be assembled and dismantled, and it can be used for several drilling operations. In this configuration, the riser, which connects the well on the sea bottom to the floating support located at the sea surface, has to withstand high internal pressures, in the same way as the casing strings of a well. These pressures, which are related to the reservoir pressure, can exceed 70 MPa.

BACKGROUND OF THE INVENTION

In general, risers are made up of pipe sections that are butt joined by means of connectors. Documents FR-2,432,672, FR-2,464,426 and FR-2,526,517 disclose connectors for risers provided with auxiliary lines. These connectors are designed to withstand relatively low pressures because the BOPs arranged on the wellhead at the sea bottom limit the maximum pressure value in the riser. In fact, under well blowout control conditions, the BOPs are closed and the fluids circulate through the auxiliary lines. According to the prior art, indexing and locking in rotation the elements of these connectors is provided by the auxiliary lines.

SUMMARY OF THE INVENTION

The present invention relates to connectors for risers without auxiliary lines, which withstand high internal pressures, considering that the blowout preventers are fastened to the upper end of the riser.

In general terms, the present invention relates to a connector for joining two pipe sections. The connector comprises a male tubular element and a female tubular element fitting into each other and having an axial shoulder, a locking ring mounted mobile in rotation on one of said tubular elements. The ring comprises studs which cooperate with the studs of the other tubular element so as to form a bayonet connection. According to the invention, the male and female tubular elements comprise teeth and cavities, the teeth of one of said elements fitting into the cavities of the other element so as to lock in rotation one of the elements in relation to the other.

According to the invention, the connector can comprise at least one joint selected so as to provide a seal, at a pressure above 20 MPa, between the male element and the female element. The seal can be mounted in a groove machined in the female element. A part of the male element in contact with the seal may have been subjected to a surface treatment. Alternatively, the seal can be mounted in a groove machined in the male element.

According to the invention, the locking ring can be mounted mobile in rotation on the male element, and locking means can allow the ring to be immobilized in relation to the male element. The locking means can allow the ring to be immobilized in relation to the male element in two immobilization positions.

The locking means can comprise a rod mounted mobile in translation on the male element and at least two holes machined in the ring, and the rod can fit into the holes. Alternatively, the locking means can comprise a key mounted mobile in rotation on the ring and slots machined in the male element, and the key can fit into the slots.

According to the invention, the connector can comprise means for guiding the male and female elements so as to guide the teeth of one of said elements into the cavities of the other element. The guide means can comprise a teat and a slot, and the teat can slide in the slot. For example, a teat arranged on the male element can slide in a slot provided on the female element, or a teat arranged on the female element can slide in a slot provided on the male element. Alternatively, the teat can be mounted on the connector, for example on the male element, on the female element or on the locking ring and the slot can be provided in a guide piece. The teat can be secured to the ring so as to also guide the studs of the ring between the studs of one of the tubular elements.

According to the invention, the female element and the locking ring can comprise each two crowns of studs exhibiting an angular offset from one crown to the next and inscribed in cylindrical surfaces of different radii so that, in the engagement position of the ring and the female element, the studs can slide in relation to one another until they reach a position where the studs of each crown of the ring fit between the studs of a corresponding crown of the female element so as to form a plurality of simultaneously locking bayonet connections.

The connector according to the invention affords the advantage of providing positioning and locking in rotation of the two parts of the connector in the absence of auxiliary lines. Furthermore, the connector according to the invention withstands and provides a seal against high pressures.

BRIEF DESCRIPTION OF THE FIGURES

Other features and advantages of the invention will be clear from reading the description hereafter, with reference to the accompanying drawings wherein.

DETAILED DESCRIPTION

Figure 1:
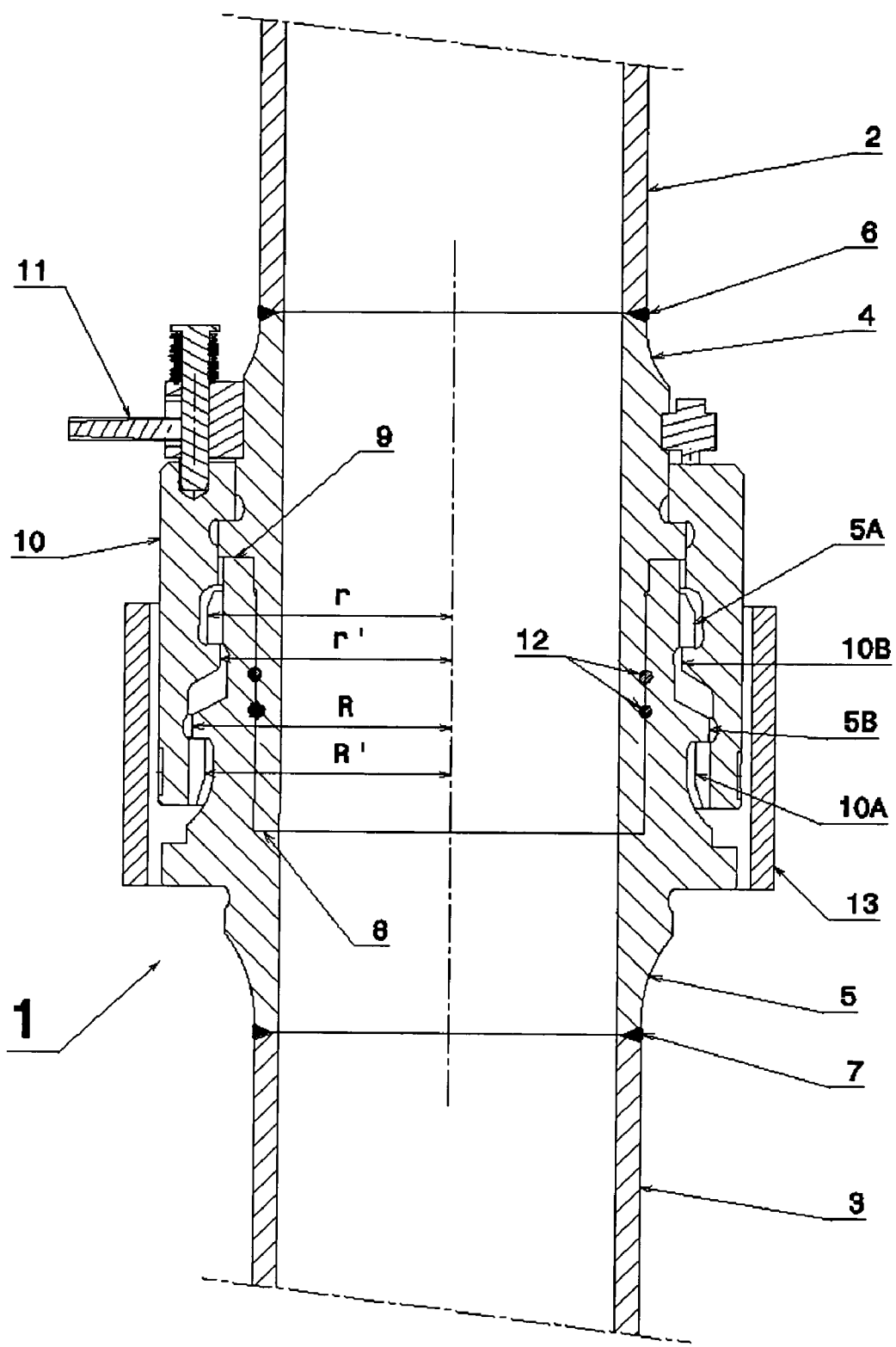
FIG. 1 diagrammatically shows a connector according to the invention.

In FIG. 1, the two pipes 2 and 3 of a riser are joined together by connector 1. Male element 4 of the connector is secured to pipe 2, for example by means of weld 6, or by making up, crimping, or squeezing or wedging connection. Female element 5 of the connector is secured to pipe 3, for example by means of weld 7, or by making up, crimping, or squeezing or wedging connection.

Male tubular element 4 fits into female tubular element 5. This fitting is limited by axial dog 8 (the end of male element 4 resting against axial shoulder 8 provided on female element 5) or by axial dog 9 (the end of female element 5 resting against axial shoulder 9 provided on male element 4). The external circular cylindrical surface of male tubular element 4 is in contact, with a radial play, with the internal circular cylindrical surface of female tubular element 5.

The connector can be designed and dimensioned to meet the requirements mentioned by the API 16R and API 2RD standards edited by the American Petroleum Institute.

Sealing of connector 1 is provided by joints 12 that can be mounted in grooves machined on male element 4 and/or on female element 5. Joints 12 prevent any fluid circulation, i.e. liquid and especially gas, between male element 4 and female element 5. Joints 12 are selected so as to provide a seal at high pressures, for example above 25 MPa, 50 MPa, 70 MPa or 100 MPa. Joints 12 can also be selected for their ability to withstand a chemically aggressive environment, for example hydrogen sulfide ($H_2S$) and hydrocarbons.

Figure 3:
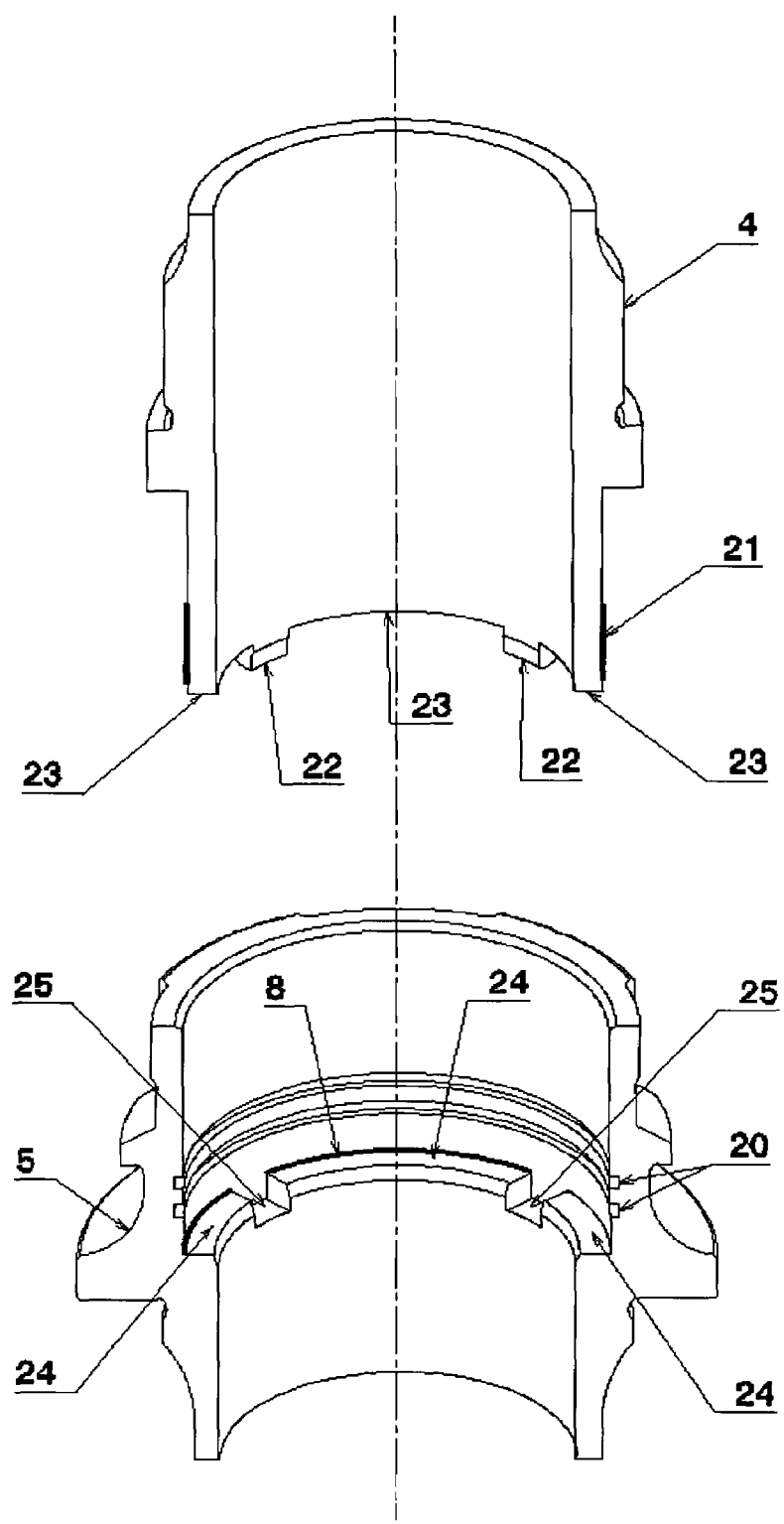
FIGS. 3 and 4 show two embodiment variants of the male and female elements of the connector.

Preferably, joints 12 are mounted on grooves 20 machined on female element 5, as shown in FIG. 3. The position of grooves 20 is advantageously located on the part of female element 5 that carries the first crown of studs 5B. Thus, this part of female element 5 having a sufficient thickness, it is not necessary to provide a reinforcement to compensate for a possible mechanical brittleness generated by grooves 20. Furthermore, the position of grooves 20 on female element 5 leaves the male element 4 a cylindrical surface portion 21 (as shown in FIG. 3) that is in contact with joints 12 when the two elements 4 and 5 are fitted into one another. This surface portion 21 can be subjected to a surface treatment. This local surface treatment improves the mechanical and/or chemical (corrosion resistance) characteristics of the part of male element 4 treated. This treatment can consist in hardening or case hardening. The treatment can also consist in coating a part of male element 4 with a material. The surface treatment prevents, on the one hand, damage to the part of male element 4 on which joints 12 rest during assembly or dismantling of male element 4 in female element 5 and prevents, on the other hand, marking by the joints of the part of male element 4 on which these joints 12 rest. Thus, the integrity of male element 4 contributes to the good sealing provided by joints 12 between the male 4 and female 5 elements. In this case, joints 12 can be O rings possibly mounted with anti-extrusion rings, quad-ring type joints, spring joints such as the Springsele joints marketed by the James Walker company.

Figure 4:
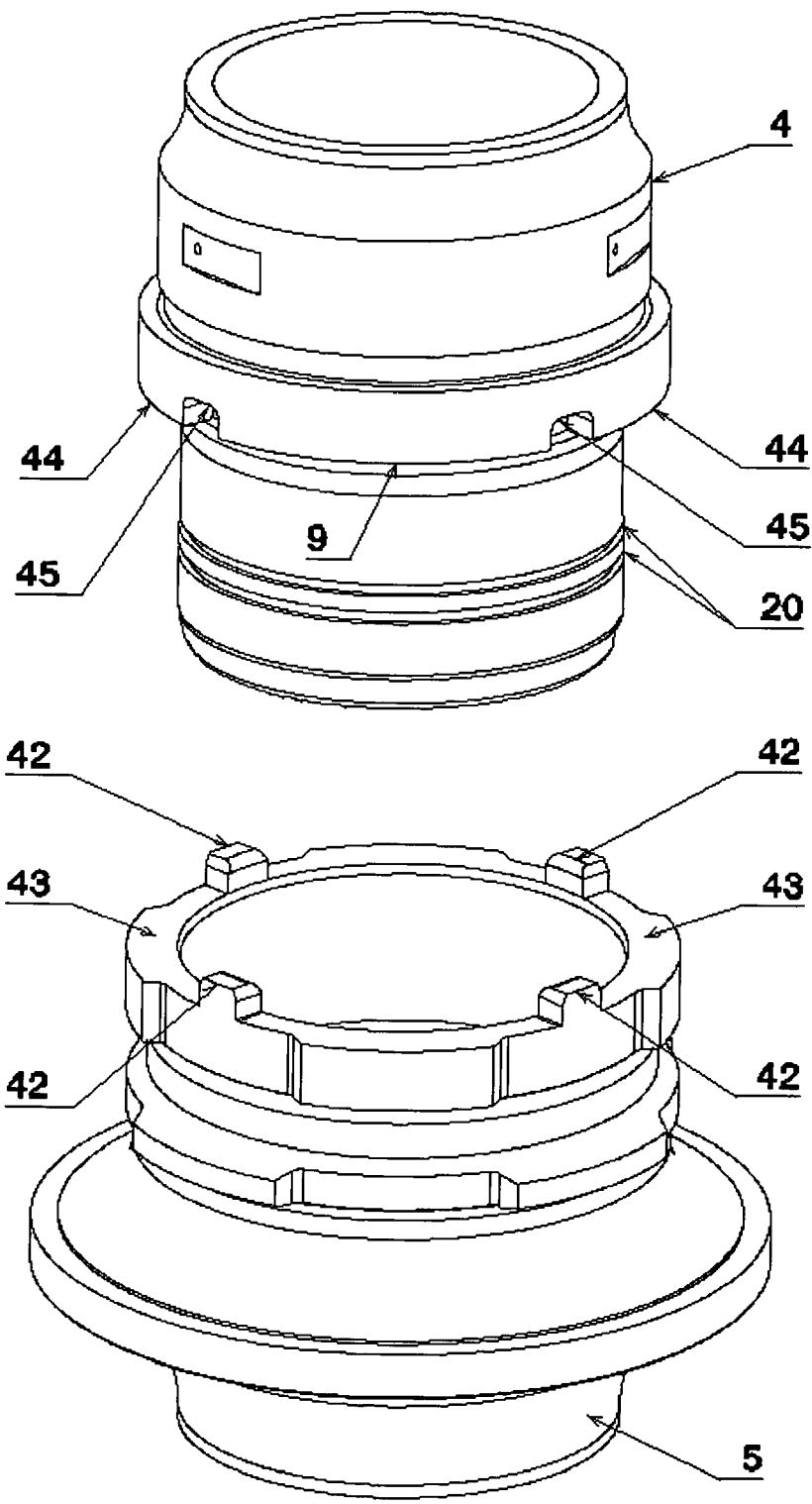

According to another embodiment, joints 12 are mounted in grooves 20 machined on male element 4 as shown in FIG. 4. In this case, joints 12 can be O rings possibly mounted with anti-extrusion rings, quad-ring type joints, lip seals with springs such as the Variseal joints marketed by the Busack company, or T joints with anti-extrusion rings such as the Teesele joints marketed by the James Walker company.

According to a variant of the invention, sealing can be achieved by contact between the end of male element 4 and shoulder 8 of female element 5. In this case, joints 12 can be mounted in grooves machined either on the end of male element 4 or on shoulder 8 of female element 5. According to another variant of the invention, sealing can be achieved by contact between the end of female element 5 and shoulder 9 of male element 4. In this case, joints 12 can be mounted in grooves machined either on the end of female element 5 or on shoulder 9 of male element 4. For these two variants, joints 12 can be lip seals with springs such as the Variseal joints marketed by the Busack company, or flanged joints.

Male element 4 and female element 5 are provided with teeth and cavities extending in the axial direction of connector 1. The teeth of one of the elements can fit into the cavities of the other element and conversely. These teeth and cavities lock in rotation male element 4 in relation to female element 5 when these two elements fit into each other.

In FIG. 3, the end of male element 4 comprises teeth 22 and cavities 23, and the female element 5 comprises teeth 24 and cavities 25 at shoulder 8. Teeth 22 can penetrate cavities 25 and teeth 24 can penetrate cavities 23 when male element 4 fits into female element 5. In FIG. 4, the end of female element 5 comprises teeth 42 and cavities 43, and the male element 4 comprises teeth 44 and cavities 45 provided at shoulder 9. Teeth 42 can penetrate cavities 45 and teeth 44 can penetrate cavities 43 when male element 4 fits into female element 5.

In FIG. 1, connector 1 comprises a locking ring 10 surrounding the ends of male and female elements 4 and 5. Locking and unlocking of connector 1 is achieved through rotation of ring 10 (bayonet type locking).

Ring 10 can be mounted mobile in rotation on male element 4. Ring 10 can be handled using a control bar, and this bar can be detachable. Locking system 11 allows ring 10 to be locked in rotation. Several locking positions can be provided for ring 10. Preferably, system 11 allows two locking positions of ring 10. In the first locking position, referred to as "open position" hereafter, the studs of ring 10 can slide between the studs of female element 5 when male element 4 fits into female element 5. In the second locking position, referred to as "closed position" hereafter, when male element 4 fits into female element 5, the studs of ring 10 are opposite the studs of female element 5 so as to axially lock ring 10 in relation to female element 5.

For example, locking system 11 comprises a bolt and at least two strikes, ring 10 being immobilized when the bolt is inserted in one of the strikes.

Figure 5:
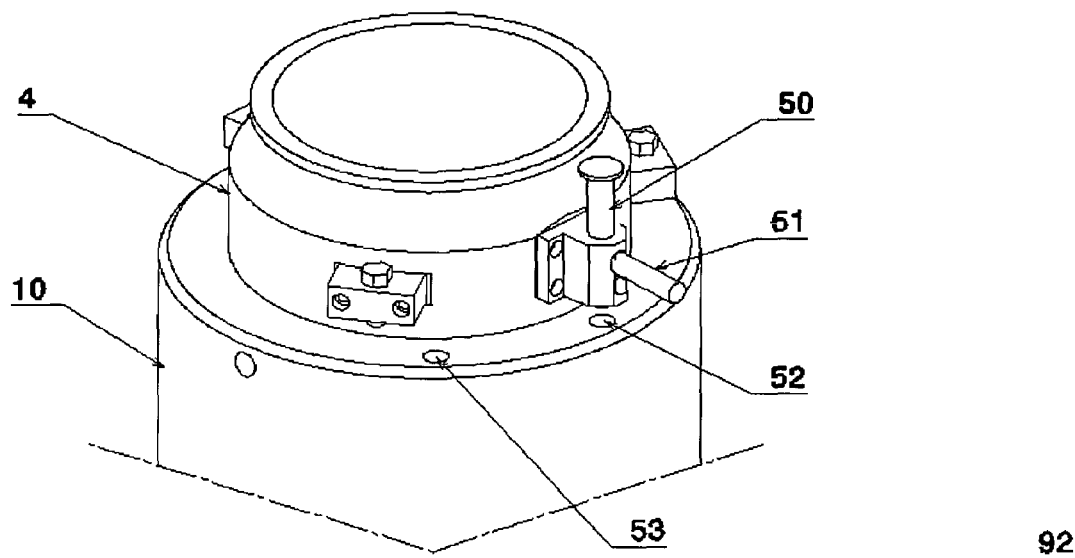
FIGS. 5 and 6 show systems for locking the ring in relation to the male element.

In connection with FIG. 5, locking system 11 can comprise a rod 50 acting as a bolt, mounted mobile in translation on male element 4. Rod 50 can be moved in translation by an operator, for example by means of handle 51. Ring 10 comprises holes 52 and 53 acting as strikes, the rod being inserted in one of holes 52 and 53 so as to lock in rotation ring 10 in relation to male element 4. For example, when rod 50 is inserted in hole 52, ring 10 is locked in the open position, and when rod 50 is inserted in hole 53, ring 10 is locked in the closed position.

Figure 6:
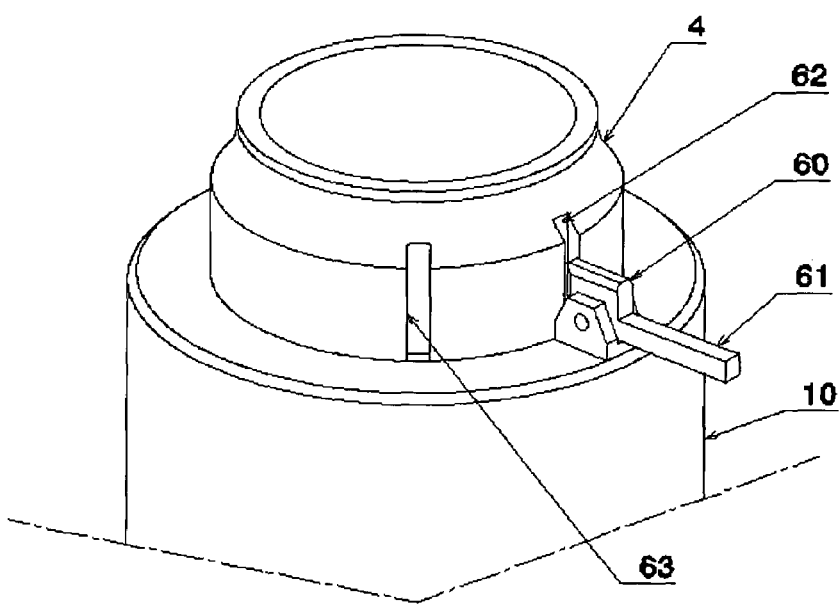

In connection with FIG. 6, according to another embodiment, locking system 11 can comprise a key 60 acting as a bolt, mobile in rotation on ring 10. For example, key 60 is mobile around an axis extending in a tangential direction to ring 10. Key 60 can be moved in rotation by an operator, for example by means of handle 61. Male element 4 comprises slots 62 and 63 acting as strikes, and key 60 lodges in one of slots 62 and 63 so as to lock in rotation ring 10 in relation to male element 4. Slots 62 and 63 can extend over a parallel plane secant with the axis of tubular male element 4. For example, when key 60 is inserted in slot 62, ring 10 is locked in the open position, and when key 60 is inserted in slot 63, ring 10 is locked in the closed position.

Figure 2:
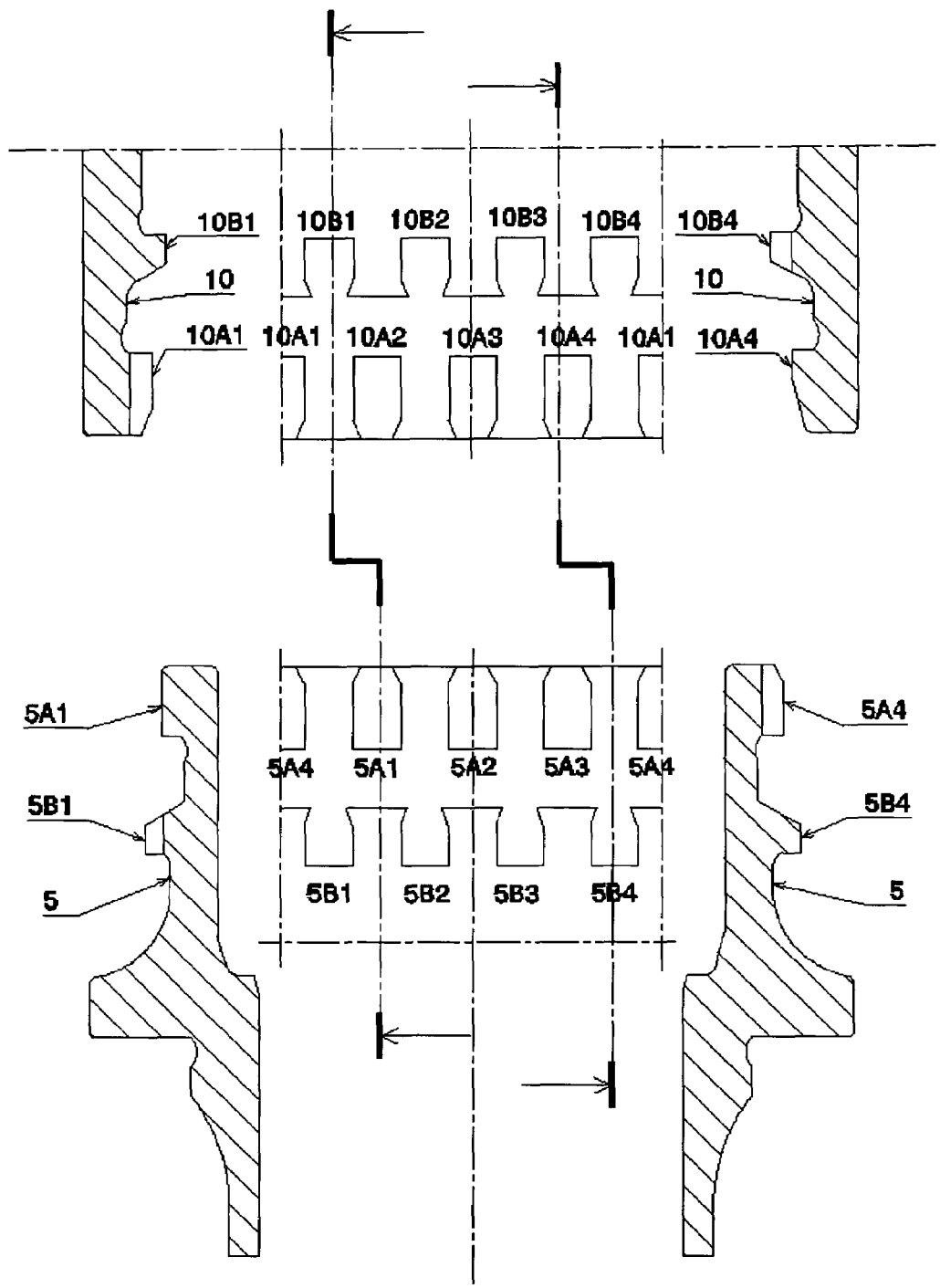
FIG. 2 shows, in developed view and in longitudinal section, the engagement of the connector elements and their locking.

In connection with FIG. 1, female element 5 and ring 10 respectively comprise two crowns of studs 5A and 5B, or 10A and 10B, allowing axial locking of connector 1. The studs preferably extend in radial directions. In FIG. 2, female element 5 comprises a first crown 5B of four studs 5B1, 5B2, 5B3 and 5B4, and a second crown 5A of four studs 5A1, 5A2, 5A3 and 5A4. Ring 10 also comprises a first crown 10B of four studs 10B1, 10B2, 10B3 and 10B4, and a second crown 10A of four studs 10A1, 10A2, 10A3 and 10A4.

The studs exhibit an angular offset from one crown to the next and are inscribed in cylindrical surfaces of different radii. The first and second crowns of female element 5 are respectively inscribed in cylindrical surfaces of radius R and r (shown in FIG. 1). The first and second crowns of ring 10 are respectively inscribed in cylindrical surfaces of radius r' and R' (shown in FIG. 1). Radius R' is slightly greater than radius r so that studs 10A1, 10A2, 10A3 and 10A4 of the second crown of ring 10 can slide and freely rotate on studs 5A1, 5A2, 5A3 and 5A4 of the second crown of female element 5.

Studs 10A1, 10A2, 10A3 and 10A4 of the second crown of ring 10 cooperate with studs 5B1, 5B2, 5B3 and 5B4 of the first crown of female element 5 so as to form a first bayonet connection system. Studs 10B1, 10B2, 10B3 and 10B4 of the first crown of ring 10 cooperate with studs SA1, 5A2, 5A3 and 5A4 of the second crown of female element 5 so as to form a second bayonet connection system.

Each one of these two bayonet connection systems can provide, between the studs of female element 5 and the studs of ring 10, contact over a total angular range of the order of 175°. The two connection systems exhibit an angular offset around the axis of the connector, the connector according to the invention distributing the axial loads over approximately 350° around the axis.

Connector 1 can also comprise guide means allowing to guide and to angularly position male element 4 and, possibly, ring 10, in relation to female element 5 when these elements fit into each other. The guide system can also guide ring 10 in rotation.

The guide means may simply consist of visual markers allowing to position male element 4 in relation to female element 5. For example, a visual marker arranged on element 4 has to be positioned opposite another visual marker on element 5.

Figure 8:
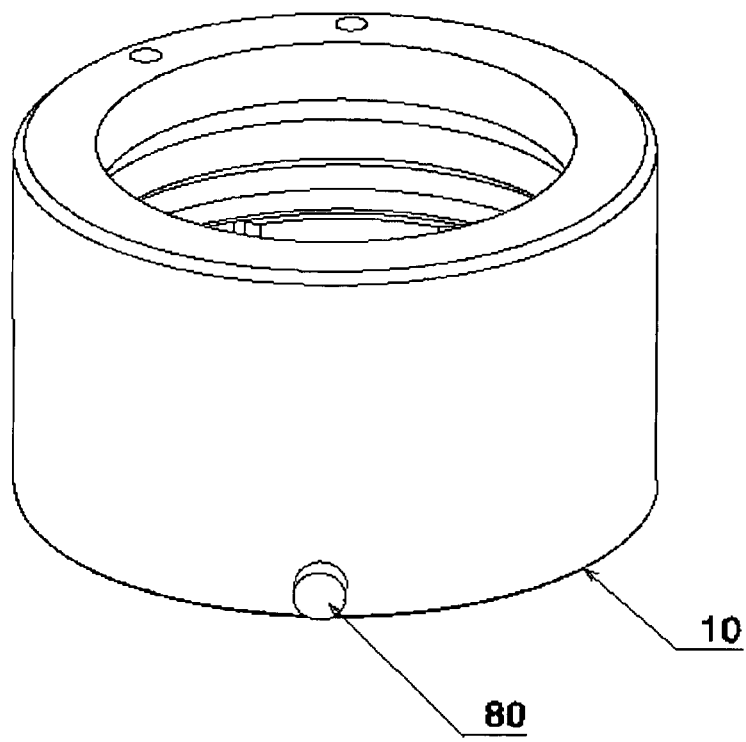
FIGS. 7 and 8 show a guide system.
Figure 7:
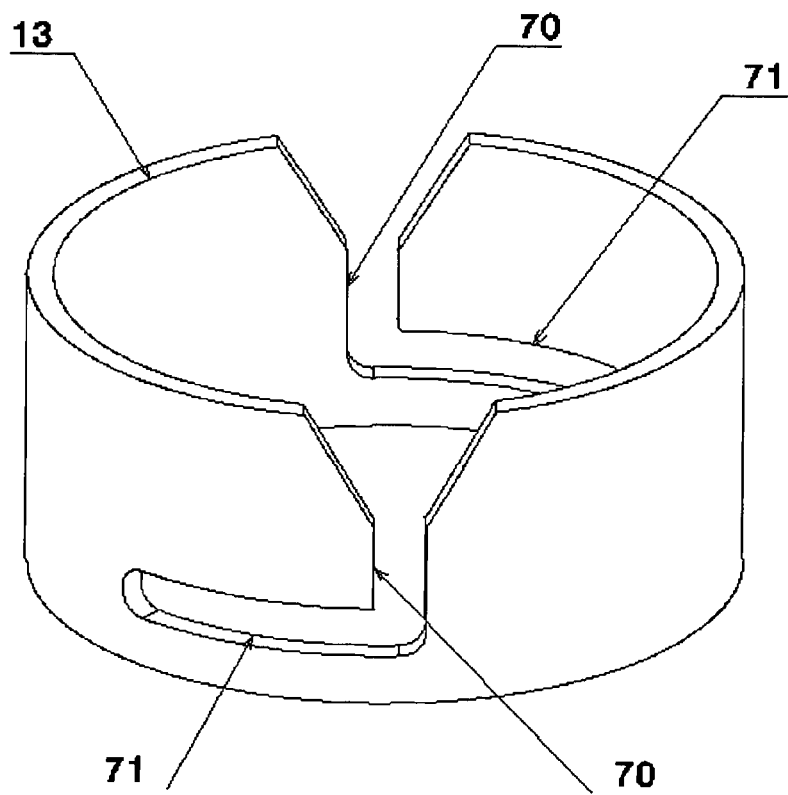

The guide means according to the invention can consist of guide piece 13 shown in FIGS. 1 and 7, and of teat 80 shown in FIG. 8. Piece 13 comprises a first slot 70 that extends in the axial direction of the connector. Teat 80 can be mounted secured to the outer surface of locking ring 10. Teat 80 can also be mounted secured to element 4. Teat 80 is engaged in slot 70 to provide guidance.

Guide piece 13 can be a tubular sleeve, for example a tube portion, covering ring 10 when the connector is assembled. Piece 13 can also be connected to female element 5 by making up, welding or any other suitable means. Guide piece 13 can be removable or detachable.

When mounting the connector, guide piece 13 is so arranged in relation to female element 5 that slot 70 extends in the axial direction of connector 1. Then, teat 80 is engaged into slot 70 to guide male element 4 in relation to female element 5. After locking of connector 1, piece 13 can be removed or remain linked to the connector depending on the embodiment thereof.

The positions of teat 80 and of slot 70 are so selected that, when male element 4 engages into female element 5, on the one hand the teeth of one of elements 4 and 5 can engage into the cavities of the other element and, on the other hand, the studs of the first and of the second crown of ring 10 can respectively engage between the studs of the second and of the first crown of female element 5.

Guide piece 13 can comprise a second slot 71 forming an arc of a circle. Slot 71 is machined on an angular portion of the circumference of guide piece 13. When teat 80 is in slot 71 at the end communicating with slot 70, ring 10 is in open position, i.e. the studs of female element 5 can slide between the studs of ring 10. When teat 80 is located at the level of the other end of slot 70, ring 10 is in closed position, i.e., in the axial direction of the connector, the studs of female element 5 face the studs of ring 10.

In order to lighten connector 1, guide piece 13 can be machined in such a way that the parts of guide piece 13 that do not carry slots 71 and/or 70 are eliminated.

Figure 9:
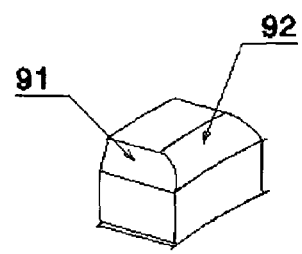
FIG. 9 shows a tooth or a beveled stud.

The guide means can also consist of bevels. The studs of female element 5 and of ring 10 can be provided with inlet bevels to facilitate fitting of male element 4 in female element 5. Similarly, teeth 22 or 44 of the male element and teeth 24 or 42 of the female element can be provided with inlet bevels. The studs can be beveled at one or more angles. FIG. 9 shows an example of a beveled stud. Parts 91 and 92 are beveled.

The following operations can be carried out for connection of the connector as shown in FIG. 1.

Operation 1:

Ring 10 is held in open position by locking system 11.

Male element 4 is arranged opposite female element 5. For example, female element 5 is suspended from a spider and element 4 is operated from the hoisting means.

The guide means described above allow angular positioning of element 4 in relation to element 5.

Operation 2:

Male element 4 is run longitudinally into female element 5 so that male element 4 fits into female element 5.

Upon sliding, on the one hand, the studs of element 5 slide between the studs of ring 10 and, on the other hand, the teeth of element 4 engage between the teeth of element 5.

Operation 3:

When element 4 fits into element 5, ring 10 is freed in rotation by acting on locking system 11, then ring 10 is rotated around the axis of the connector. Ring 10 is rotated until a closed position is reached, i.e. the studs of ring 10 are positioned opposite the studs of female element 5. The guide system can limit rotation of the ring.

When ring 10 is in closed position, ring 10 is immobilized in relation to element 4 by acting on locking system 11.

The invention claimed is:

1. A connector for joining two pipe sections, comprising a male tubular element and a female tubular element fitting into each other and having an axial shoulder, one of the male tubular element and the female tubular element having studs provided on an outer surface thereof, a locking ring mounted mobile in rotation on one of said tubular elements, the ring comprising studs which cooperate with the studs of at least one of the male tubular element and the female tubular element so as to form a bayonet connection, characterized in that each of the male and female tubular elements comprises teeth and cavities, the teeth of one of said elements fitting into the cavities of the other element so as to lock in rotation one of the elements in relation to the other.

2. A connector as claimed in claim 1, comprising at least one joint selected so as to provide a seal, at a pressure above 20 MPa, between the male element and the female element.

3. A connector as claimed in claim 2, wherein the seal is mounted in a groove machined in the female element.

4. A connector as claimed in claim 3, wherein a part of the male element in contact with the seal has been subjected to a surface treatment.

5. A connector as claimed in claim 2, wherein the seal is mounted in a groove machined in the male element.

6. A connector as claimed in claim 1, wherein the locking ring is mounted mobile in rotation on the male element and locking means allow the ring to be immobilized in relation to the male element.

7. A connector as claimed in claim 6, wherein the locking means allow the ring to be immobilized in relation to the male element in two immobilization positions.

8. A connector as claimed in claim 6, wherein the locking means comprises a rod mounted mobile in translation on the male element and at least two holes machined in the ring, and the rod can fit into the holes.

9. A connector as claimed in claim 6, wherein the locking means comprises a key mounted mobile in rotation on the ring and slots machined in the male element, and the key can fit into the slots.

10. A connector as claimed in claim 1, comprising means for guiding said elements so as to guide the teeth of one of said elements into the cavities of the other element.

11. A connector as claimed in claim 10, wherein the guide means comprises a teat and a slot, and the teat can slide in the slot.

12. A connector as claimed in claim 11, wherein the teat is mounted on the connector and the slot is provided in a guide piece.

13. A connector as claimed in claim 12, wherein the teat is secured to the ring so as to also guide the studs of the ring between the studs of one of the tubular elements.

14. A connector as claimed in claim 1, wherein the studs are provided on the outer surface of the female element in two crowns of studs exhibiting an angular offset from one crown to the next and inscribed in cylindrical surfaces of different radii, and the locking ring comprises two crowns of studs exhibiting an angular offset from one crown to the next and inscribed in cylindrical surfaces of different radii so that, in the engagement position of the ring and the female element, the studs can slide in relation to one another until they reach a position where the studs of each crown of the ring fit between the studs of a corresponding crown of the female element so as to form a plurality of simultaneously locking bayonet connections.

15. A riser comprising:
   at least first and second pipe sections; and
   a connector for joining the first and second pipe sections, the connector comprising:
      a male tubular element and a female tubular element fitting into each other and having an axial shoulder, one of the male tubular element and a female tubular element having studs provided on an outer surface thereof;
      a locking ring mounted mobile in rotation on one of said tubular elements, the ring comprising studs which cooperate with the studs of at least one of the male tubular element and a female tubular element so as to form a bayonet connection,
      characterized in that each of the male and female tubular elements comprises teeth and cavities, the teeth of one of said elements fitting into the cavities of the other element so as to lock in rotation one of the elements in relation to the other;
   wherein the riser does not include auxiliary lines.

16. A riser without auxiliary lines, comprising:
   at least first and second pipe sections; and
   a connector for joining the first and second pipe sections, the connector comprising:
      a male tubular element and a female tubular element fitting into each other and having an axial shoulder, one of the male tubular element and a female tubular element having studs provided on an outer surface thereof;
      a locking ring mounted mobile in rotation on one of said tubular elements, the ring comprising studs which cooperate with the studs of at least one of the male tubular element and a female tubular element so as to form a bayonet connection,
   characterized in that each of the male and female tubular elements comprises teeth and cavities, the teeth of one of said elements fitting into the cavities of the other element so as to lock in rotation one of the elements in relation to the other.

* * * * *